(12) United States Patent
Yi et al.

(10) Patent No.: US 9,819,433 B2
(45) Date of Patent: Nov. 14, 2017

(54) METHOD AND APPARATUS FOR WIRELESS COMMUNICATION

(71) Applicant: LG ELECTRONICS INC., Seoul (KR)

(72) Inventors: Yunjung Yi, Seoul (KR); Byounghoon Kim, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 14/903,033

(22) PCT Filed: Jul. 25, 2014

(86) PCT No.: PCT/KR2014/006849
§ 371 (c)(1),
(2) Date: Jan. 5, 2016

(87) PCT Pub. No.: WO2015/012655
PCT Pub. Date: Jan. 29, 2015

(65) Prior Publication Data
US 2016/0164622 A1 Jun. 9, 2016

Related U.S. Application Data

(60) Provisional application No. 61/858,128, filed on Jul. 25, 2013.

(51) Int. Cl.
*H04J 3/16* (2006.01)
*H04L 5/00* (2006.01)
(Continued)

(52) U.S. Cl.
CPC .......... *H04J 3/1694* (2013.01); *H04B 7/2656* (2013.01); *H04L 5/001* (2013.01);
(Continued)

(58) Field of Classification Search
CPC ......... H04L 5/001; H04L 5/0044; H04L 5/16; H04L 1/1861; H04L 5/0035
See application file for complete search history.

(56) References Cited

U.S. PATENT DOCUMENTS 9,642,140 B2 * 5/2017 Ng ................... H04W 72/0453
2007/0133481 A1 6/2007 Stanwood et al.
(Continued)

FOREIGN PATENT DOCUMENTS

WO WO 2012/124996 A2 9/2012

*Primary Examiner* — Gbemileke J Onamuti
(74) *Attorney, Agent, or Firm* — Birch, Stewart, Kolasch & Birch, LLP

(57) ABSTRACT

A method and an apparatus for wireless communication is provided. The apparatus configured for time division multiplex (TDM) between time division duplex (TDD) and frequency division duplex (FDD), comprises a radio frequency (RF) unit for transmitting and receiving a radio signal, and a processor operatively coupled to the RF unit, wherein the processor is configured for transmitting signals via the RF unit based on a scheduling for UL and/or DL, wherein the RF unit receives signal from at least one cell and transmits signal to at least one cell with carrier aggregation, and wherein the processor performs single transmission of signal on uplink and single reception of signal on downlink at one subframe via the RF unit.

11 Claims, 23 Drawing Sheets

(51) Int. Cl.
*H04L 5/14* (2006.01)
*H04L 5/16* (2006.01)
*H04B 7/26* (2006.01)
*H04L 1/18* (2006.01)

(52) U.S. Cl.
CPC .......... *H04L 5/0032* (2013.01); *H04L 5/0044* (2013.01); *H04L 5/0055* (2013.01); *H04L 5/14* (2013.01); *H04L 5/143* (2013.01); *H04L 5/1469* (2013.01); *H04L 5/16* (2013.01); *H04L 1/1861* (2013.01); *H04L 5/0035* (2013.01)

(56) References Cited

U.S. PATENT DOCUMENTS

| | | |
|---|---|---|
| 2007/0197256 A1 | 8/2007 | Lu et al. |
| 2010/0290369 A1 | 11/2010 | Hui et al. |
| 2013/0100865 A1 | 4/2013 | Baghel et al. |
| 2013/0190027 A1* | 7/2013 | Cao .................. H04W 52/0206 455/509 |
| 2014/0003303 A1 | 1/2014 | Yang et al. |
| 2015/0023228 A1* | 1/2015 | Yin ........................ H04L 5/001 370/280 |

* cited by examiner

[Fig. 1]
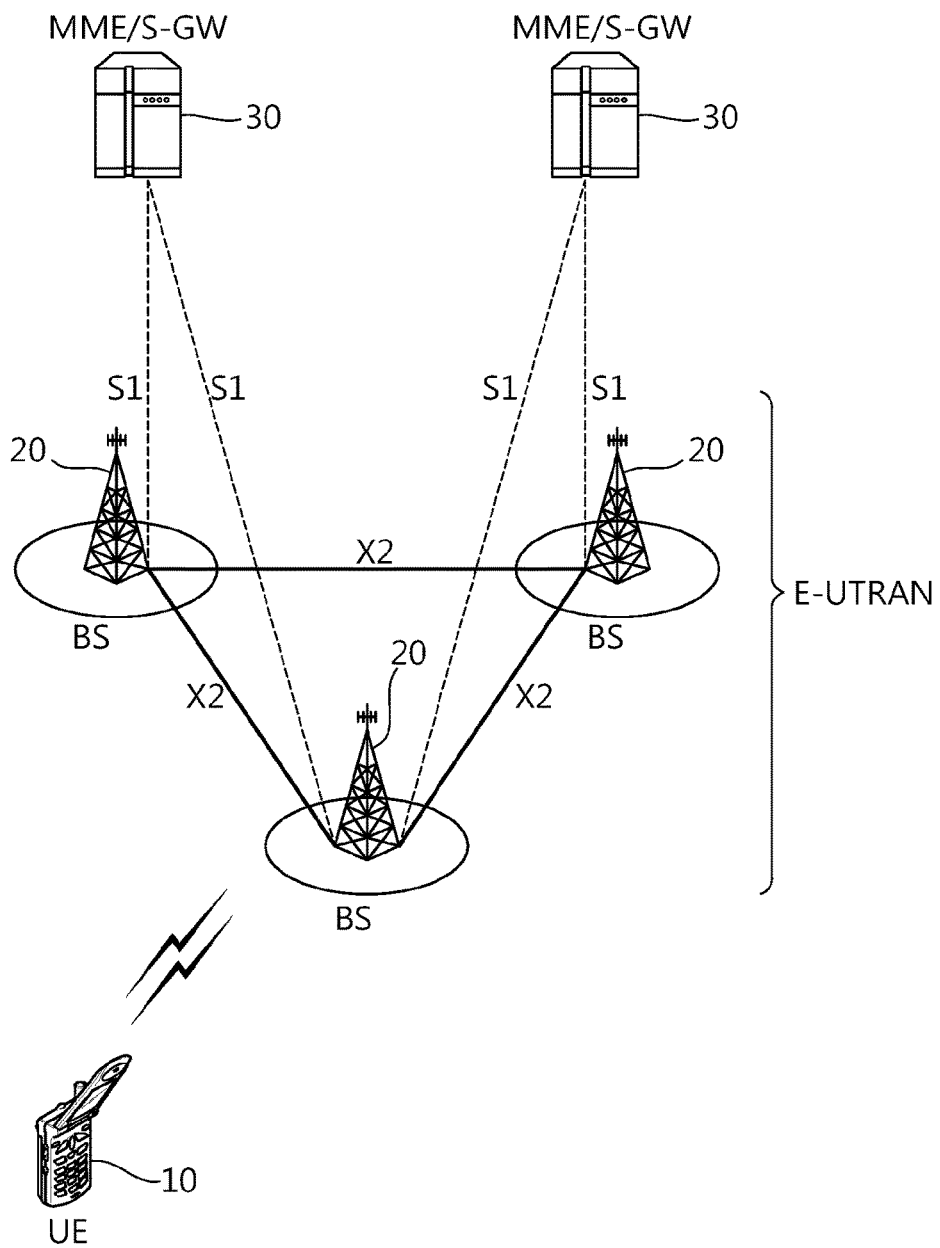

[Fig. 2]
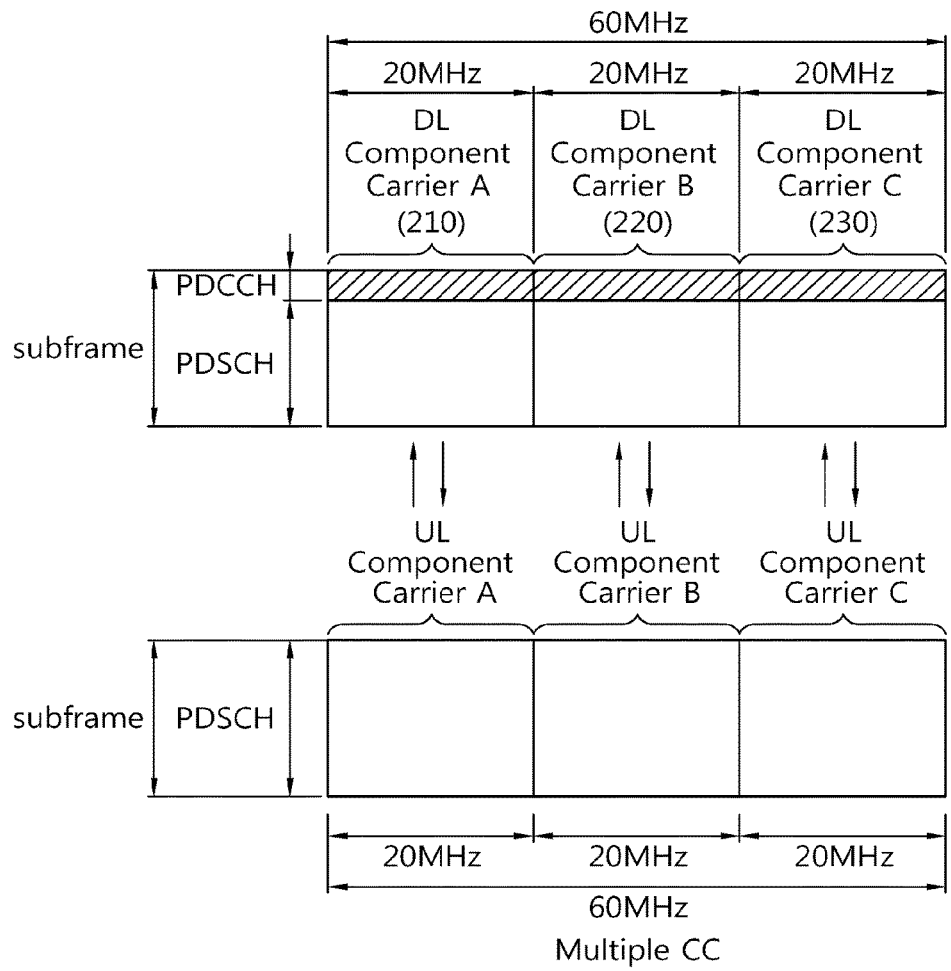
[Fig. 3]
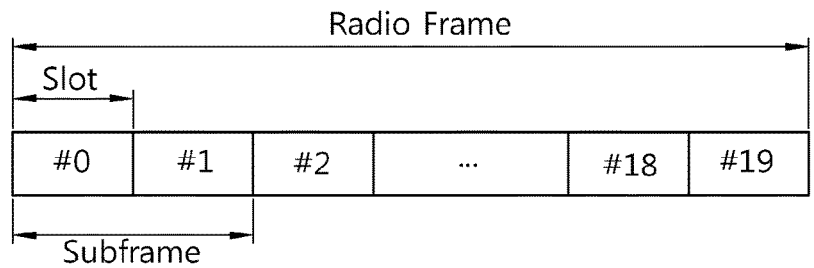

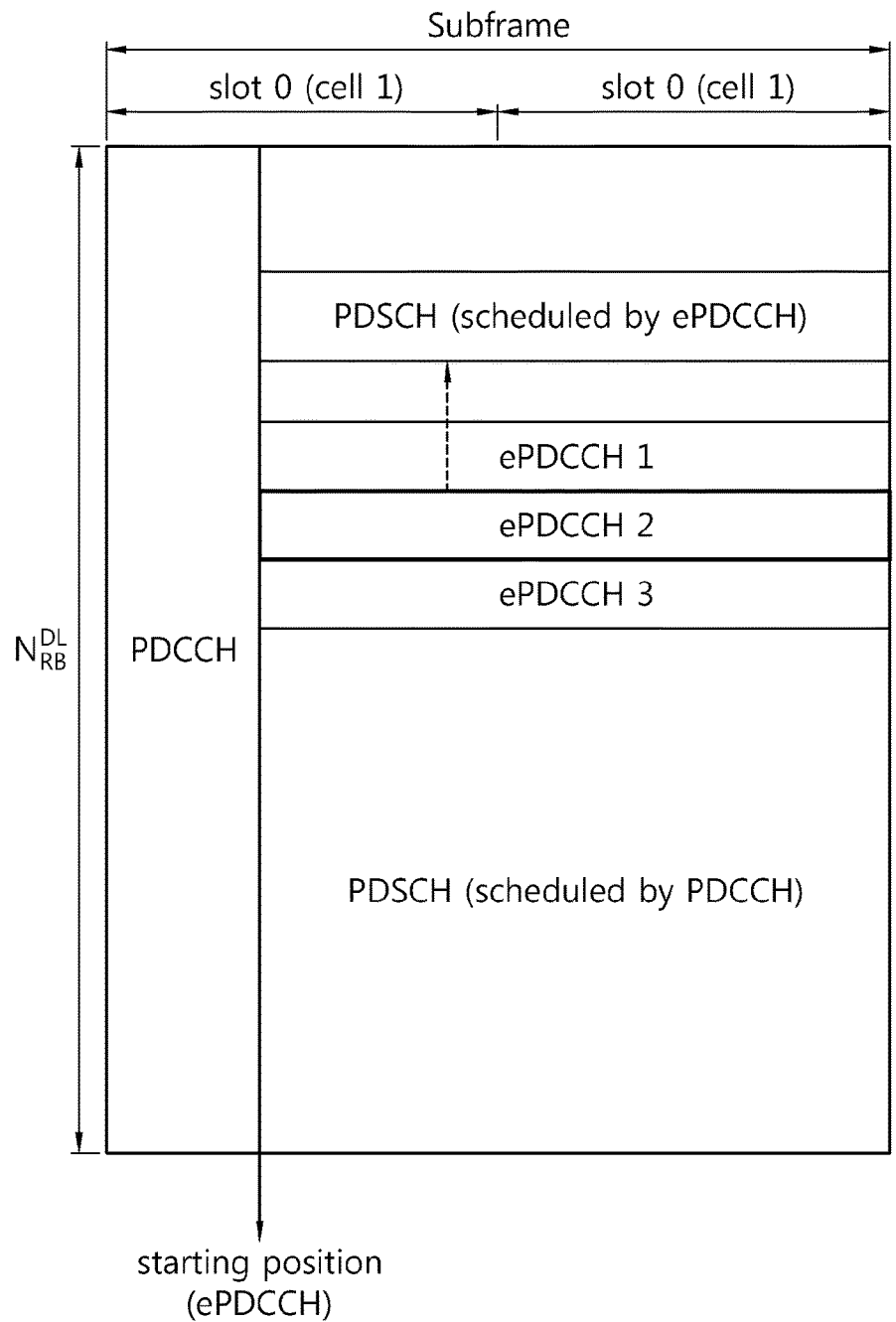
[Fig. 4]

[Fig. 5]
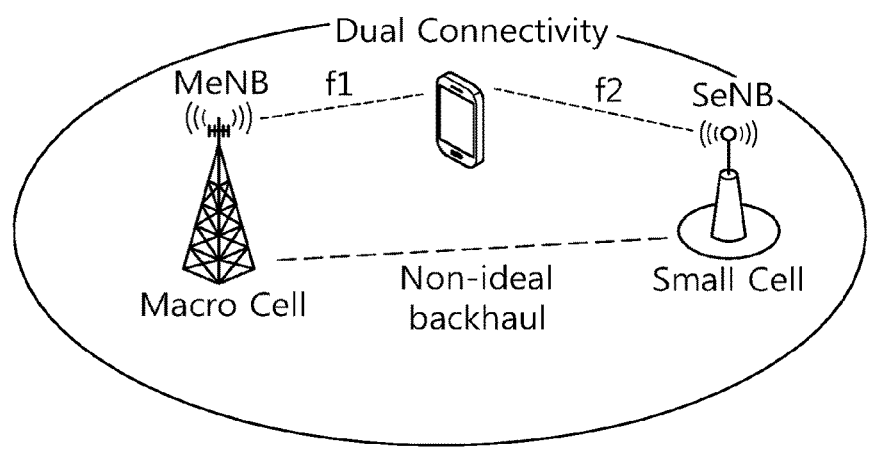

[Fig. 6]
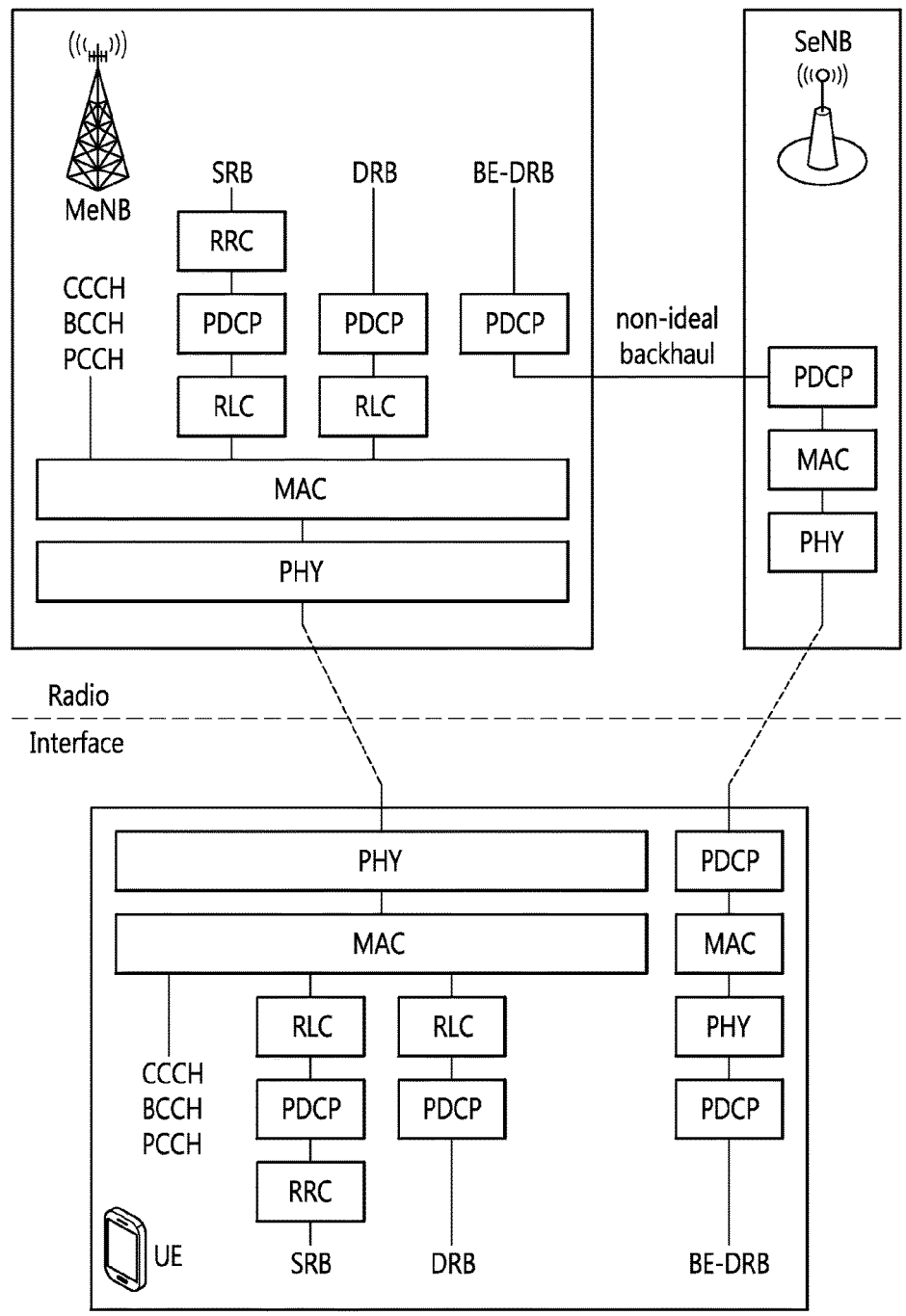

[Fig. 7]
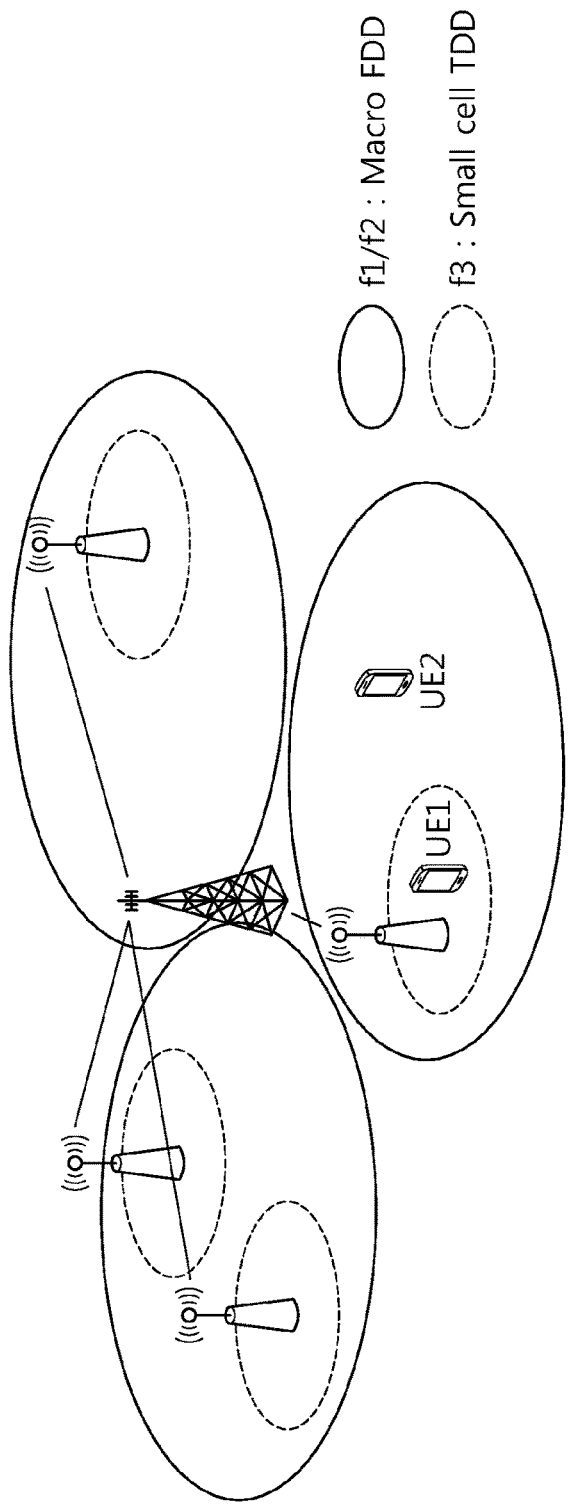

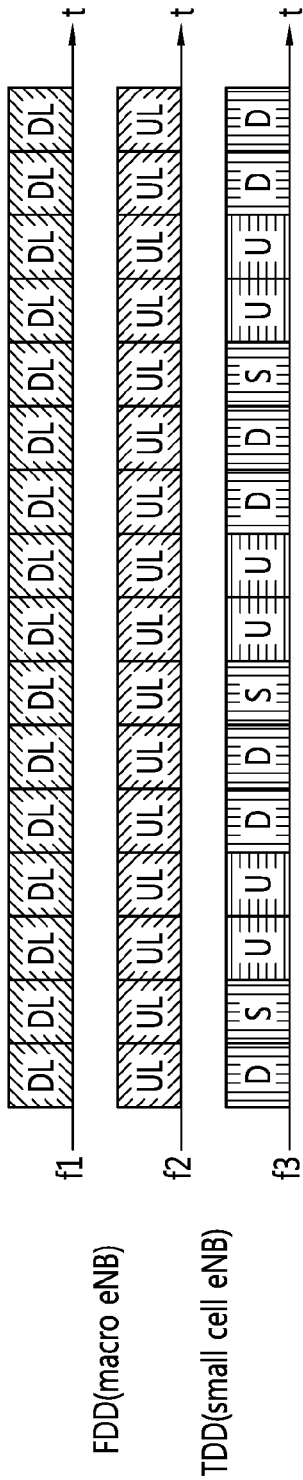
[Fig. 8]

[Fig. 9]
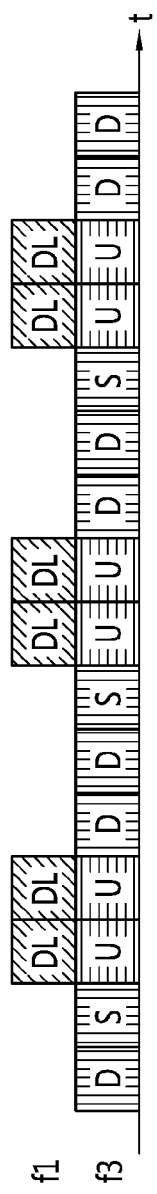

[Fig. 10]
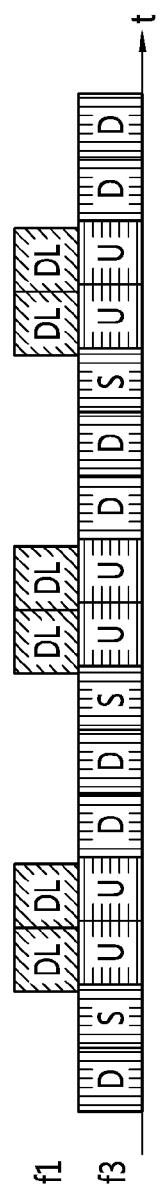

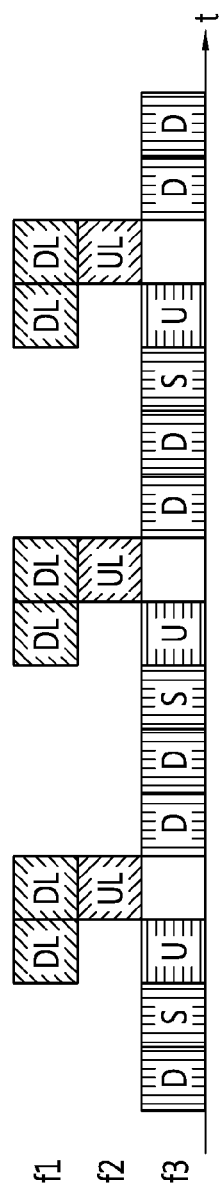
[Fig. 11]

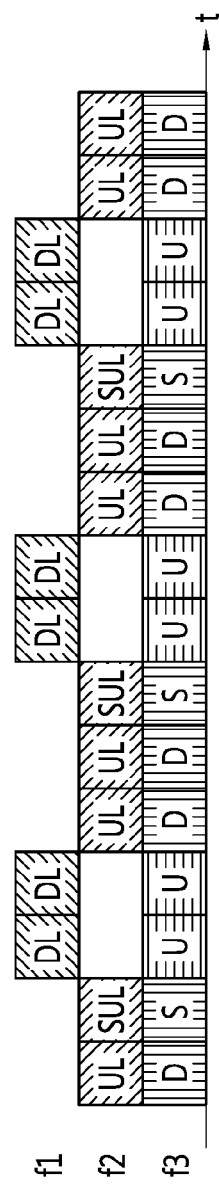
[Fig. 12]

[Fig. 13]
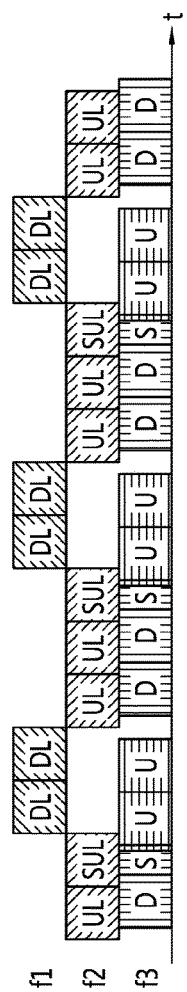
[Fig. 14]
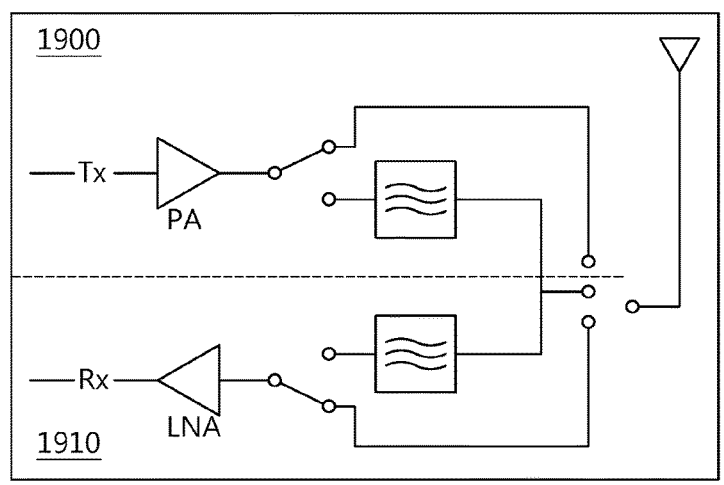

[Fig. 15]
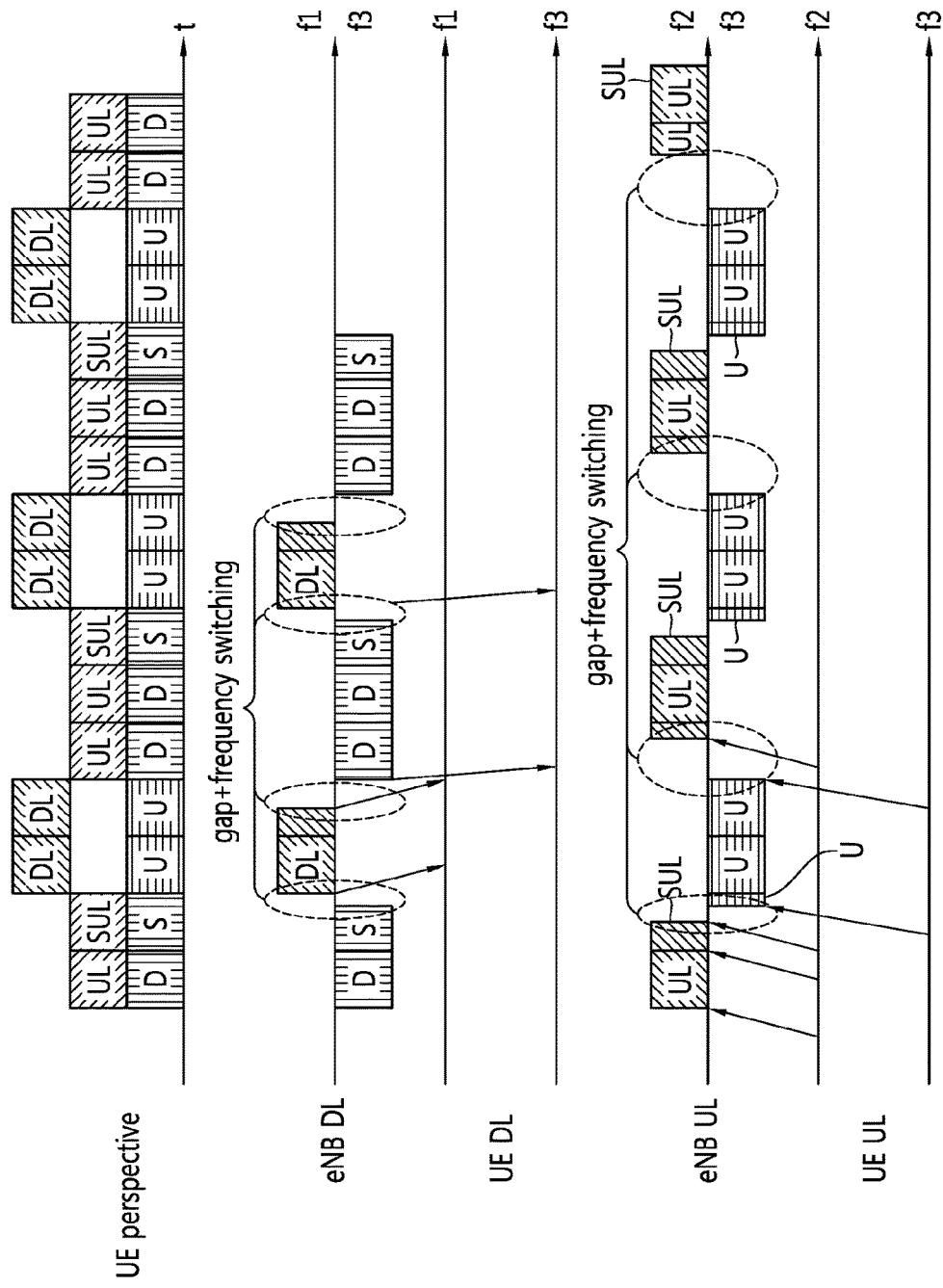

[Fig. 16]
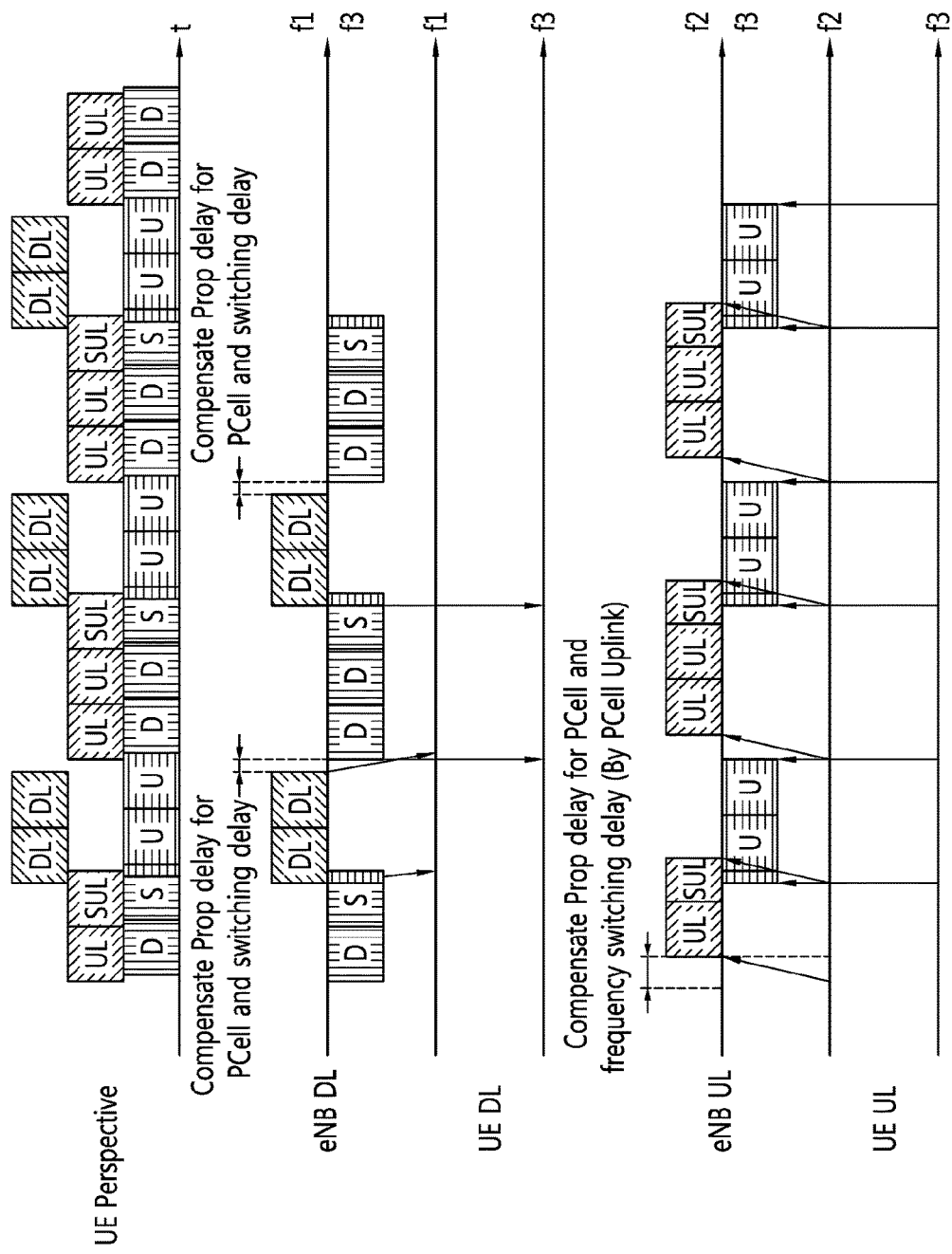

[Fig. 17]
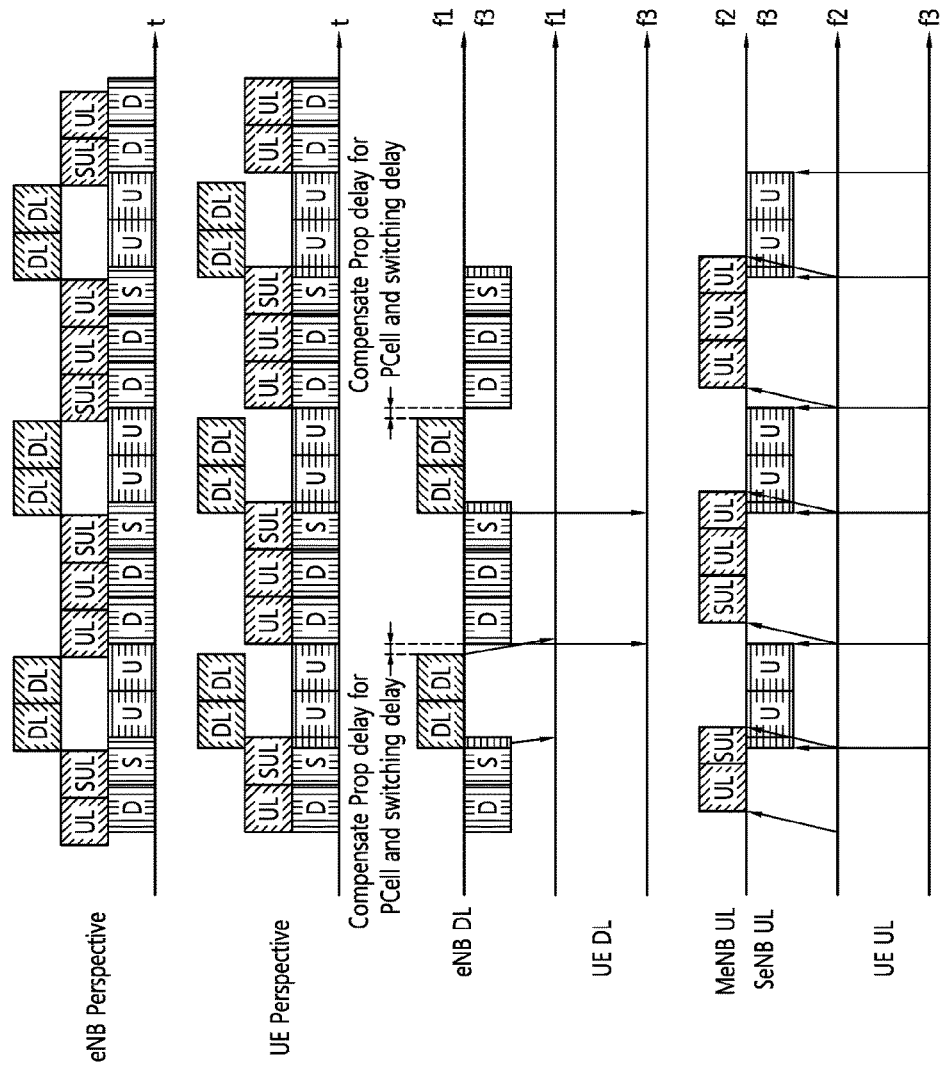

[Fig. 18]
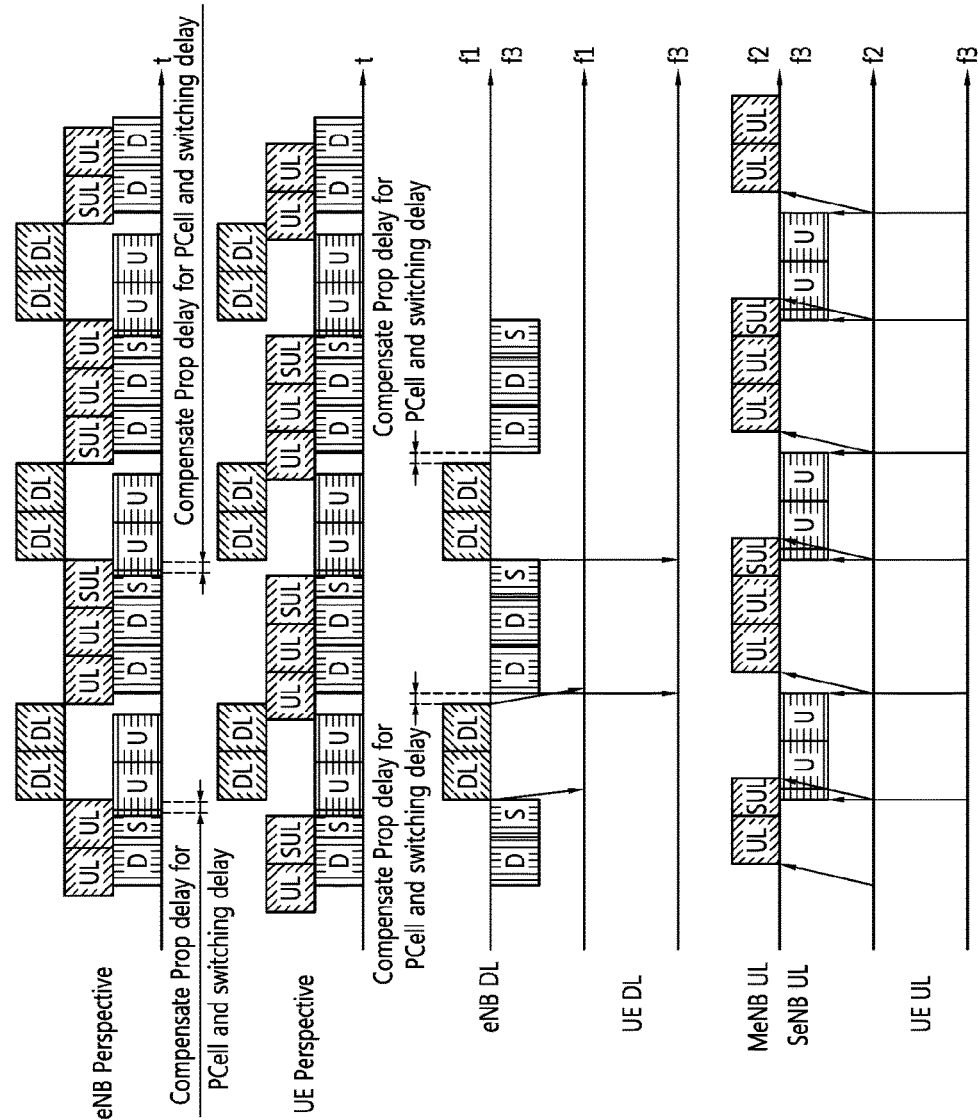

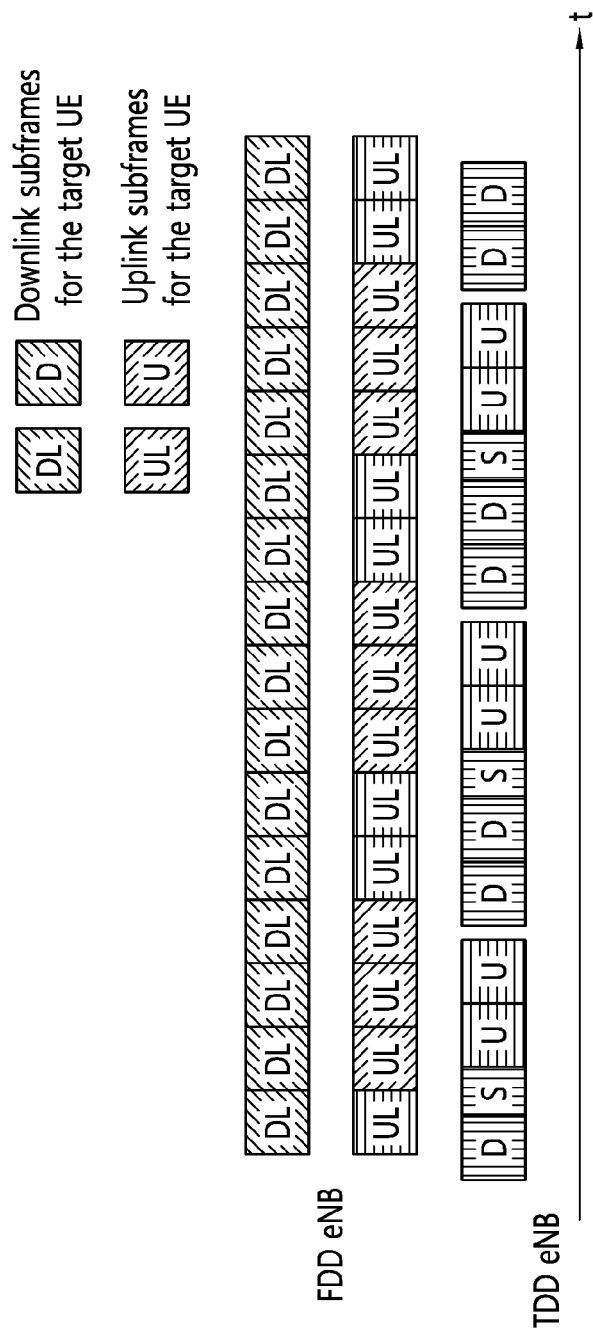

[Fig. 20]
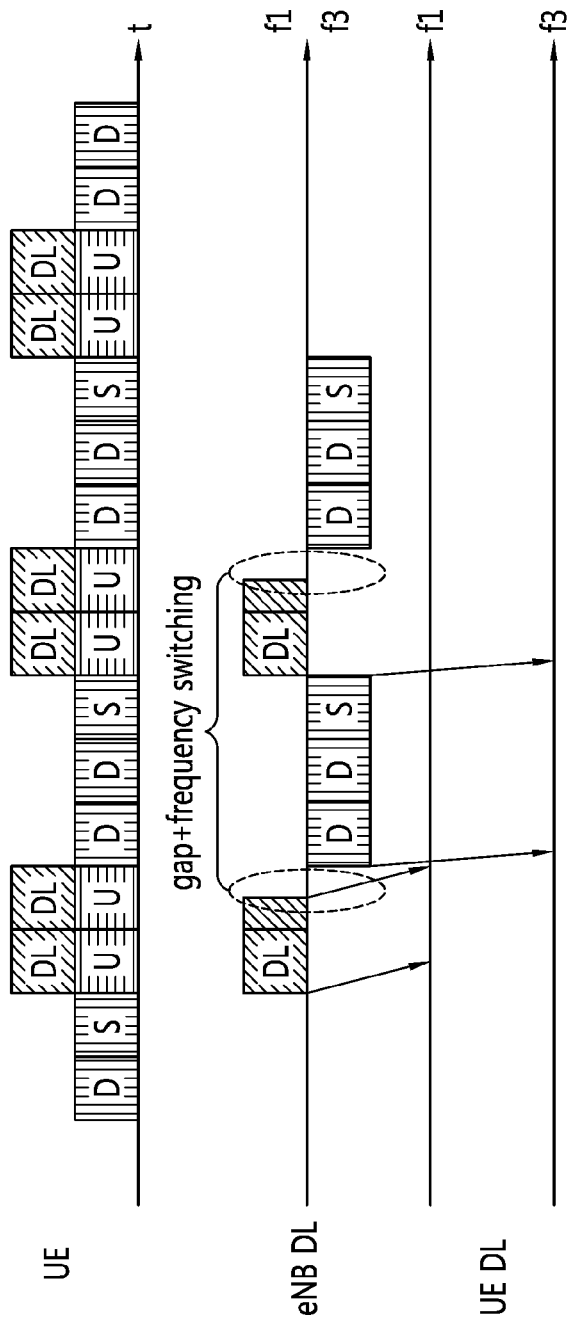

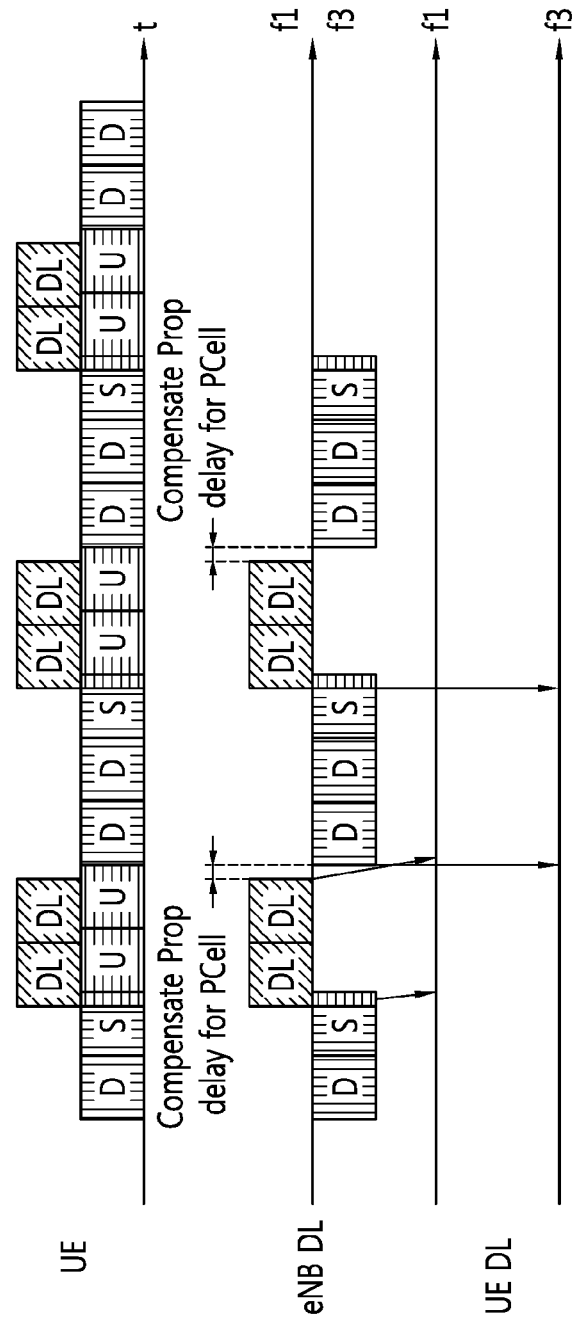
[Fig. 21]

[Fig. 22]
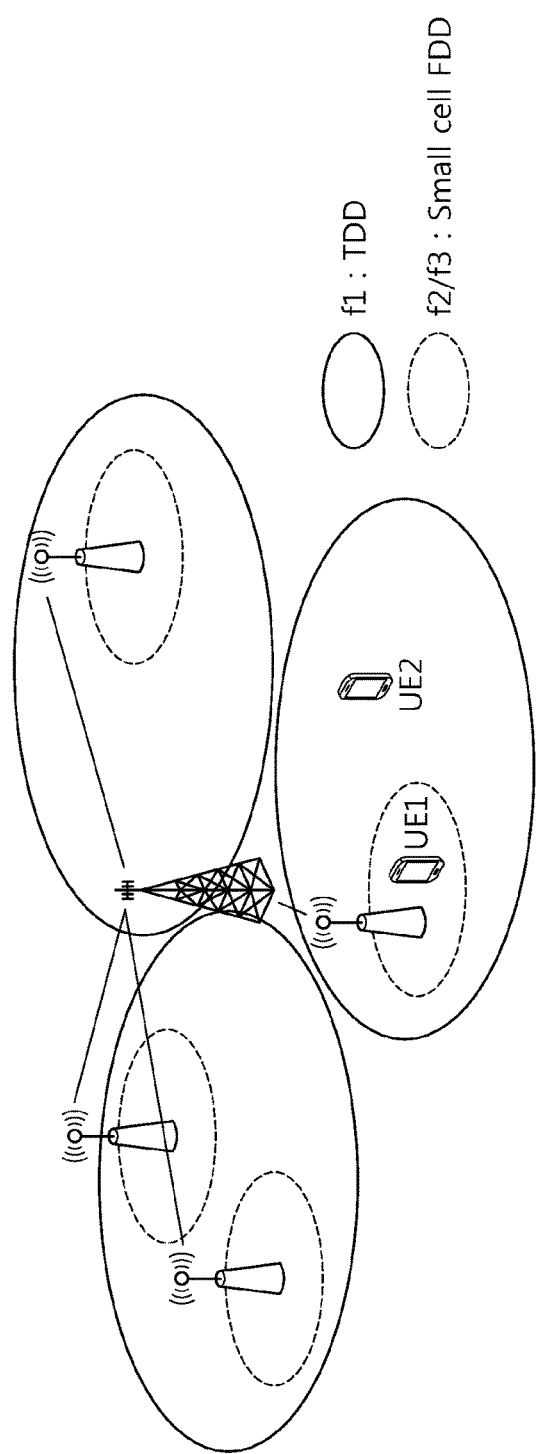

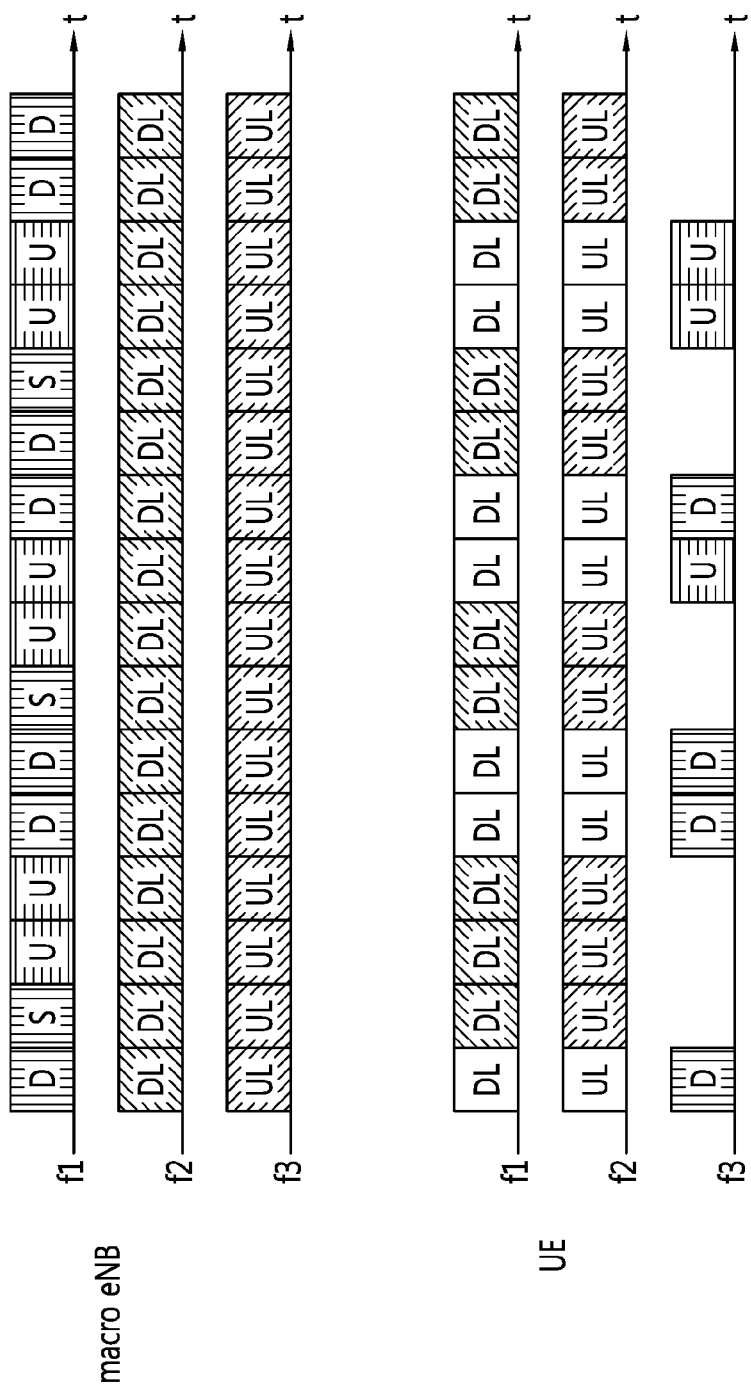
[Fig. 23]

[Fig. 24]
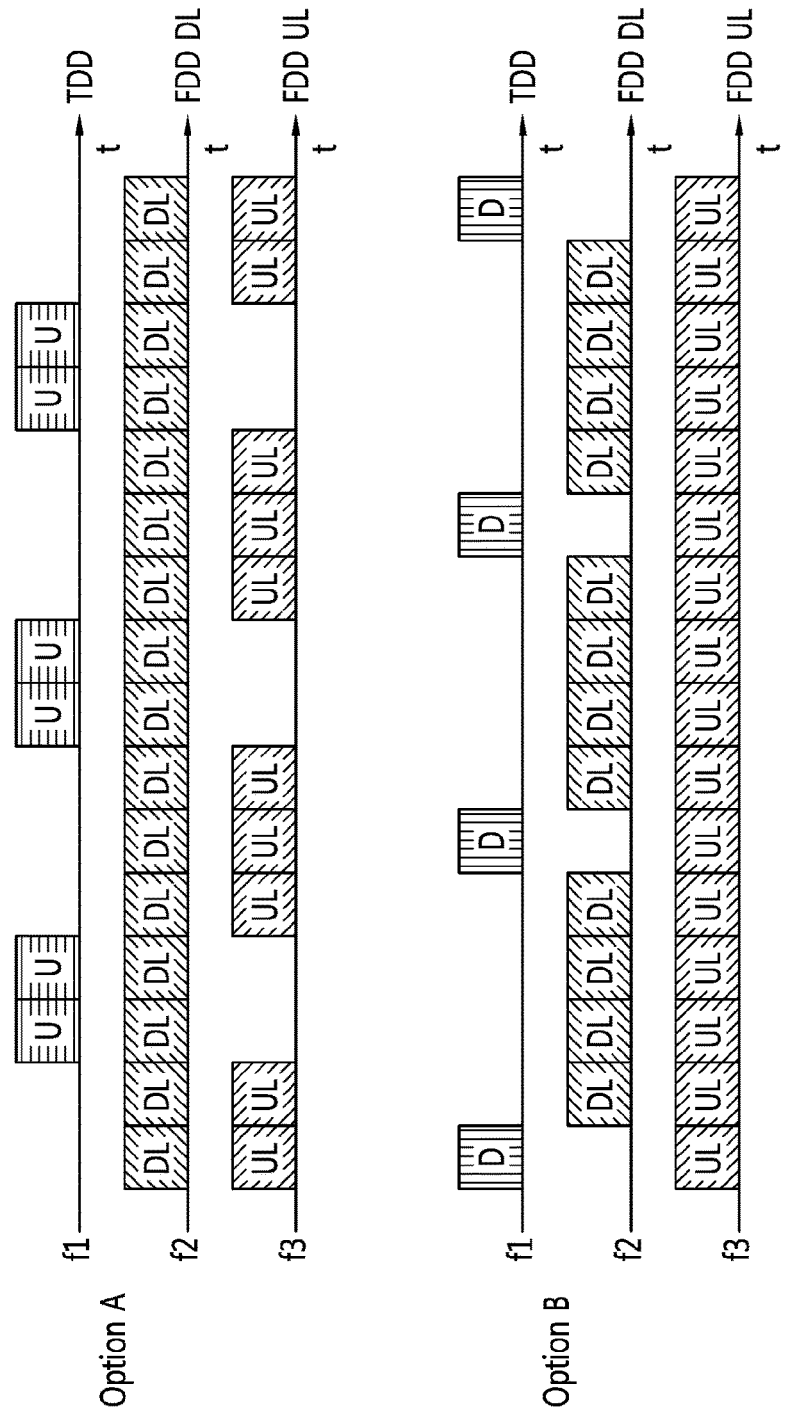

[Fig. 25]
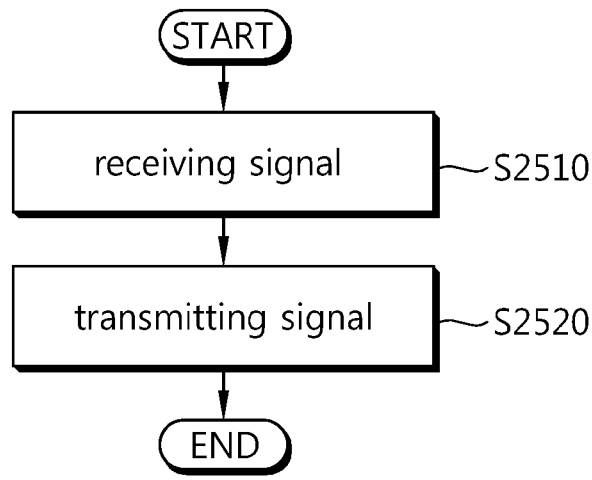
[Fig. 26]
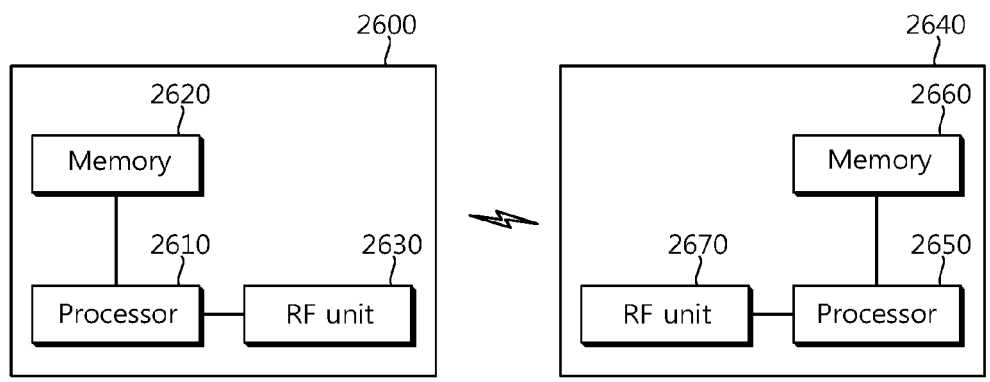

METHOD AND APPARATUS FOR WIRELESS COMMUNICATION

CROSS REFERENCE TO RELATED APPLICATIONS

This application is the National Phase of PCT International Application No. PCT/KR2014/006849, filed on Jul. 25, 2014, which claims priority under 35 U.S.C. 119(e) to U.S. Provisional Application No. 61/858,128, filed on Jul. 25, 2013, all of which are hereby expressly incorporated by reference into the present application.

TECHNICAL FIELD

The application is related to a wireless communication, more specifically related to time division multiplex between time division duplex and frequency division duplex for a FDD-TDD dual mode UE.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an enhanced Node B (eNB) and an user equipment (UE) as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment needs to be defined. The efficient operation includes proper monitoring and synchronization timing for small cells and macro cell. When different duplex mode (FDD and TDD) carriers are aggregated, new issues are raised. One issue would be the capability of simultaneous reception and transmission at the UE either due to hardware capability (half-duplex UEs) or due to interference between FDD and TDD carriers.

SUMMARY OF INVENTION

Technical Problem

An object of the present invention is to provide a method and an apparatus for TDM between TDD and FDD.

Another object of the present invention is to provide a method for a UE of dual mode with single Tx/Rx capability in one subframe under TDM between TDD and FDD.

Solution to Problem

An embodiment for the present invention is an user equipment (UE) supporting FDD-TDD dual mode configured for time division multiplex (TDM) between time division duplex (TDD) and frequency division duplex (FDD) with single RF and baseband capability. Here, the UE comprises a radio frequency (RF) unit for transmitting and receiving a radio signal and a processor operatively coupled to the RF unit, wherein the processor is configured for transmitting signals via the RF unit based on a scheduling for UL and/or DL, wherein the RF unit receives signal from at least one cell and transmits signal to at least one cell with carrier aggregation, and wherein the processor performs single transmission of signal on uplink and single reception of signal on downlink at one subframe via the RF unit.

An another embodiment for the present invention is a method of time division multiplex (TDM) between time division duplex (TDD) and frequency division duplex (FDD) by a user equipment (UE). Here, the method comprises receiving signal from at least one cell according to the downlink scheduling, and transmitting signal to at least one cell according to the uplink scheduling, wherein single transmission of signal is performed on uplink and single reception of signal is performed on downlink at one subframe.

The proposed methods can be applied to general UEs supporting FDD and TDD.

Advantageous Effects of Invention

According to the present invention, TDM can be efficiently performed between TDD and FDD by a FDD-TDD dual mode UE.

According to the present invention, wireless communication system can be operated efficiently for single Tx/Rx in one subframe under TDM can be efficiently performed between TDD and FDD.

According to the present invention, a UE can be efficiently operated when the UE has dual mode supporting both FDD and TDD and capability of simultaneous Tx/Rx in a subframe.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows an example of dual connectivity to a macro cell and a small cell.

FIG. 6 shows an example of a protocol architecture supporting dual connectivity.

FIG. 7 briefly illustrates an example of dual connectivity which the UE supports.

FIG. 8 briefly illustrates an example of TDD/FDD configuration.

FIGS. 9 to 13 briefly describe available approaches for a FDD/TDD dual mode UE with single RX and TX capability.

FIG. 14 briefly describes an example of TDD/FDD dual mode block diagram.

FIG. 15 briefly illustrates gap to handle different propagation delay and frequency switching delay.

FIG. 16 briefly illustrates uplink timing change by PCell to absorb the gap.

FIG. 17 briefly illustrates UL special subframe.

FIG. 18 briefly illustrates guard period utilization.

FIG. 19 briefly illustrates the case that uplink timing for TDD eNB and downlink timing for TDD eNB is adjusted to absorb the gap latency.

FIG. 20 briefly illustrates an example of gap to handle different propagation delay and frequency switching delay.

FIG. 21 briefly illustrates this alternative example frequency switching.

FIG. 22 briefly illustrates an example of dual connectivity between TDD macro cell and FDD small cell.

FIG. 23 briefly describes TDD and FDD configuration corresponding to the case of FIG. 22.

FIG. 24 briefly illustrates an example of continuous DL (upper) and UL (below) FDD operation.

FIG. 25 is a flow chart briefly describing an operation of UE.

FIG. 26 is a block diagram which briefly describes a wireless communication system including an UE and a BS.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SCFDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number NAL of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDCCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MB-SFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, a UE may receive signals from more than one cell and transmit signals to more than one cell under some circumstances.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable.

Dual connectivity is an operation where a given UE consumes radio resources provided by at least two different network points (master eNB (MeNB) and secondary eNB (SeNB)) connected with non-ideal backhaul while in RRC_CONNECTED.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB is responsible for transmitting best effort (BE) type traffic, while the MeNB is responsible for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms such as CASES 2 and 3 of this application described above.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

This application describes a few approaches to utilize "single RX and TX capability" of a FDD/TDD dual mode UE under various scenarios.

A UE may have multiple RX and TX capability to support carrier aggregation scenario. In those cases, the proposed method and apparatus may be applicable to one RX/TX pair. For example, a UE supports carrier aggregation up to 2 component carriers (2 CCs) with dual RX and TX capability, one pair of RX/TX pair which supports dual mode of FDD and TDD can be used for supporting scenarios described in this application.

The overall goal of various embodiments of the present application is to maximize the user throughput and minimize the service interruption time (due to hand-over, etc) within the UE capability. If UE is equipped with single RX and TX capability, a type of Time Division Multiplexing (TDM) scheme may be used for dual connectivity and if UE is equipped with multiple RX and TX capability, control plane can be supported by a RX/TX pair which can be shared for user plane data transmission/reception.

Without loss of generality, from now on, it can be assumed that a UE has single RX/TX capability with FDD and TDD dual mode support. Since the UE has single RX/TX capability, to support dual connectivity, UE needs to be scheduled with one downlink and/or uplink at one time (assuming no cross-subframe scheduling is used).

More specifically, the UE shall be scheduled with downlink either from macro eNB or small cell eNB (or C/U-Plane CC respectively) and/or uplink scheduling transmitted for either macro eNB or small cell eNB (or C/U-Plane CC respectively).

FIG. 7 briefly illustrates an example of dual connectivity which the UE supports.

Referring to FIG. 7, the UE 1 is connected with macro cell and small cell. The macro cell is configured with FDD and the small cell is configured with TDD. As shown in FIG. 7, f1 and f2 are bands for FDD and f3 is a band for TDD.

FIG. 8 briefly illustrates an example of TDD/FDD configuration. Here, f1 is a band configured for FDD downlink from the macro eNB and f2 is a band configured for FDD uplink to the macro eNB. Further, f3 is a band configured for TDD and the small cell eNB. In addition, for TDD, "D" means for downlink, "U" means for uplink and "S" means for special subframe (SUL).

However, when the UE supports FDD/TDD dual mode but just has single RX and TX capability, it needs to adjust or schedule downlink and uplink between macro cell and small cell. Furthermore, when a UE has multiple RX and TX capability, to support dual connectivity and carrier aggregation effectively, single RX and TX capability can be used for TDM between FDD/TDD as proposed in this application. Thus, in this case, other approaches besides the case of FIG. 8 are needed for FDD/TDD dual mode UE with single RX and TX capability.

FIGS. 9 to 13 briefly describe available approaches for a FDD/TDD dual mode UE with single RX and TX capability. Specifically, with single RX and TX capability for a FDD/TDD dual mode UE, a few alternative approaches as shown in FIGS. 9 to 13 can be considered to support dual connectivity (one to the macro eNB which handles mobility issue for the UE and the other to the small cell eNB which maintains connection mainly for data offloading).

Since C-Plane may have only sporadic data transmissions, it is natural to consider time-share the UE capability of TX and RX between FDD (PCell) and TDD (SCell). This invention discusses the detail considerations to realize different options.

FIG. 9 briefly describes an option of the present invention. FIG. 9 illustrates that TDD subframes of small cell and FDD subframes of macro cell. In this case of FIG. 9, partial subframes of FDD downlink subframes are configured for the UE.

FIG. 10 briefly describes another option of the present invention. FIG. 10 illustrates that TDD subframes of small cell and FDD subframes of macro cell. In this case of FIG.

9, partial subframes of FDD downlink subframes are configured for the UE. Different from option of FIG. 9, in FIG. 10, the TDD downlink timing is adjusted as shown. The option of FIG. 10 may be a variation of option of FIG. 9.

FIG. 11 briefly describes yet another option of the present invention. FIG. 11 illustrates TDM between TDD uplink and FDD uplink. In this case of FIG. 11, FDD is also configured for macro cell and TDD is configured for small cell.

FIG. 12 briefly describes yet another option of the present invention. FIG. 12 illustrates TDM between TDD and FDD. In this case of FIG. 12, TDD is configured for small cell and FDD is configured for macro cell.

FIG. 13 briefly describes yet another option of the present invention. FIG. 13 illustrates that TDM between TDD and FDD. In this case of FIG. 13, FDD is configured for macro cell and TDD is configured for small cell. Different from option of FIG. 12, in FIG. 13, the TDD timing is adjusted for downlink and uplink timing is adjusted as shown. The option of FIG. 13 may be a variation of option of FIG. 12.

For the case of LTE, LTE modem has TX and RX capability. For FDD capable UE, in general two receive modules are equipped to support simultaneous TX and RX (one for self-cancellation of transmission signal and the other for receiving). This application provides a few options to utilize the FDD UE capability to support TDD CA (where supporting two TDD carriers) or to support TDD/FDD CA (where supporting two carriers in TDM fashion).

FIG. 14 briefly describes an example of TDD/FDD dual mode block diagram. As shown in FIG. 14, one approach to support FDD/TDD dual mode is to use "switch" at both TX side and RX side separately where TX is associated with filter and RX is associated with noise filter. If FDD/TDD dual mode is supported for a pair of frequency bands for FDD and TDD, it can be expected that dynamic switching between FDD and TDD may be feasible as well.

Yet, the overhead for frequency tuning and timing issue should be considered for dynamic switching support.

Embodiments or examples of present invention are based on this idea to support various scenarios where FDD and TDD bands are available.

Even though a UE can be operated only in either FDD or TDD (semi-static switch only), dynamic switch between FDD and TDD may allow "dual connectivity" or carrier aggregation between FDD and TDD carrier for the UE without requiring additional hardware complexity to support two carriers (one FDD carrier and one TDD carrier).

These inventions on the present application allow dual connectivity or carrier aggregation for a FDD/TDD dual mode UE (however it may not equipped with carrier aggregation capability) to support both stable mobility support and high data throughput by small cell offloading.

Option 1—TDM Between FDD and TDD

This option is to fully utilize the uplink and downlink capability. To realize this option, two approaches may be considered.

One is to implement this option as if carrier aggregation of half-duplex FDD and TDD carriers. PCell can be assumed as "Half-duplex" FDD and SCell can be assumed as "TDD".

Another approach is to time-share between FDD carrier and TDD carrier for downlink and uplink respectively.

For both approaches, in terms of handling soft buffer, UE may assume that two carriers are aggregated. Alternatively, the network may configure the number of HARQ processes used per each carrier. Based on the number of HARQ processes, the UE may partition soft buffer size. For example, the maximum number of HARQ processes may be limited to 8 which may be partitioned between two carriers.

Also, it is considerable that PCell (or master eNB) assigns the size of soft buffer for SCell (or secondary eNB) which may be used by the UE.

When the first approach is used, this shall be informed to the eNB so that eNB can configure half-duplex FDD mode or perform based on half-duplex mode UE and TDD when carrier aggregation is used. If first approach is used, it can follow half-duplex FDD operation where the gap between DL and UL subframe switching can be utilized. To support first approach, the UE may have to signal "half-duplex" FDD capability in a frequency band so that the network can perform properly. Additionally, it can send CA capability between HD-FDD carrier and TDD carrier. Not to incur simultaneous reception or transmission in one subframe, the UE may also indicate simultaneous DL or UL is not feasible at one time. In general, a UE can send "CA capable for a band combination" which can be used for FDD-TDD CA by a dual mode capability addressed in this application. Then, the network may determine which mechanism the network should apply including Option 1. In this case, separate signalling of HD-FDD capability may not be needed. Otherwise, eNB may assume that second approach is used where downlink is shared between FDD downlink subframes and TDD downlink subframes and uplink is shared between FDD uplink subframes and TDD uplink subframes.

In other words, this option is to allow "dynamic switch" of switches to change between FDD and TDD mode shown in FIG. 14.

To handle "switching delay" and "frequency tuning latency" and potential differences of propagation delay, a gap (similar to Option 2) would be required whenever changes would be occurred. Using the second approach, it can be shown as if "half-duplex" FDD yet the UL/DL configuration is rather fixed.

A UE, once SCell is configured, it may compute the UL/DL configuration for the PCell. Or, it may be configured by higher layer to use a pattern of UL/DL configuration. Or, it can be assumed as if two TDD carriers are aggregated where the UL/DL configuration of PCell or SCell may be different from the existing UL/DL configurations.

In terms of handling soft buffer and HARQ process, a UE may assume that carrier aggregation is configured (i.e., the configured CC number is 2). In terms of PHICH and HARQ-ACK timing, with a new TDD UL/DL configuration, a new PHICH and HARQ-ACK timing can be defined using table as below (note that this is an example, different tables can be defined as long as it supports possible new UL/DL configuration—applicable to half-duplex mode FDD and/or TDD).

Table 1 shows an existing TDD UL/DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 defines a TDD UL/DL configuration according to the present application.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | U | US | D | D | S | U | US | D | D | D |
| 1_C | 5 ms | U | US | D | S | U | U | US | D | S | U |
| 2_C | 5 ms | U | US | S | U | U | U | US | S | U | U |
| 3_C | 10 ms | U | US | D | D | S | U | U | U | U | U |
| 4_C | 10 ms | U | US | D | S | U | U | U | U | U | U |
| 5_C | 10 ms | U | US | S | U | U | U | U | U | U | U |
| 6_C | 5 ms | U | US | D | D | S | U | US | D | S | U |

Table 3 defines HARQ-ACK/NACK signaling timing based on the TDD UL/DL configuration defined in table 2.

TABLE 3

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | 4 | 7 | 8 | | | 4 | 7 | 8 |
| 1_C | 5 ms | | | 4 | 6 | | | | 4 | 6 | U |
| 2_C | 5 ms | | | 4 | | | | | 4 | | |
| 3_C | 10 ms | | | 4 | 4 | 4 | | | | | |
| 4_C | 10 ms | | | 4 | 4 | | | | | | |
| 5_C | 10 ms | | | 4 | | | | | | | |
| 6_C | 5 ms | | | 4 | 6 | 5 | | | 4 | 7 | |

Here, HARQ-ACK/NACK signal is transmitted at (n+k)-th subframe when PDSCH is transmitted at n-th subframe (n, k are integer and n>0, k>0).

Table 4 defines an UL grant timing based on the TDD UL/DL configuration defined in table 2.

TABLE 4

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | 4 | 7 | 8 | | | 4 | 7 | 8 |
| 1_C | 5 ms | | | 4/7/8 | 8/11/12 | | | | 4/7/8 | 8/11/12 | |
| 2_C | 5 ms | | | 4/5/6/7 | | | | | 4/5/6/7 | | |
| 3_C | 10 ms | | | 4/5/6 | 6/7 | 7/10 | | | | | |
| 4_C | 10 ms | | | 4/5/6/7 | 7/8/11/12 | | | | | | |
| 5_C | 10 ms | | | 4/5/6/7/8/9/11/12/13 | | | | | | | |
| 6_C | 5 ms | | | 4 | 6 | 6/7 | | | 4 | 7/8 | |

Here, PUSCH is transmitted at (n+k)-th subframe when UL grant is received at n-th subframe (n, k are integer and n>0, k>0).

Table 5 defines PHICH timing based on the TDD UL/DL configuration defined in table 2.

TABLE 5

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | 6 | 3 | 2 | | | 6 | 3 | 2 |
| 1_C | 5 ms | | | 12/13/6 | 12/9/8 | | | | 12/13/6 | 12/9/8 | |
| 2_C | 5 ms | | | 6/5/4/13 | | | | | 6/5/4/13 | | |
| 3_C | 10 ms | | | 6/5/4 | 4/13 | 13/10 | | | | | |
| 4_C | 10 ms | | | 5/5/4/13 | 3/2/9/8 | | | | | | |
| 5_C | 10 ms | | | 6/5/3/13/12/11/9/8/7 | | | | | | | |
| 6_C | 5 ms | | | 6 | 4 | 4/13 | | | 6 | 13/12 | |

Here, PHICH is transmitted at n-th subframe when PHICH is transmitted (n−k)-th subframe (n, k are integer and n>0, k>0).

Meanwhile, for the gap for downlink and uplink, PCell downlink subframe a few last OFDM symbols or PCell uplink subframe a few first OFDM symbols may be used. Alternatively, SCell OFDM symbols may be used for the gap. Another alternative is to utilize either PCell or SCell depending on the case.

For example, gap for DL frequency switching and others will be allocated at PCell downlink and gap for the UL frequency switching may be handled by SCell uplink.

In terms of gap duration, alternatively, the whole subframe can be assumed as a gap instead of a few OFDM symbols to simplify the gap handling.

FIG. 15 briefly illustrates gap to handle different propagation delay and frequency switching delay. Here, SUL represent special uplink subframe.

For example, in FIG. 15, when additional gap is needed, it may be assumed that the whole subframe will not be used for neither downlink nor uplink transmission.

If uplink grant is scheduled in prior to transmit PUSCH at the gap subframe, PUSCH may be ignored. If PUCCH transmission is planned at the subframe, a UE may transmit the PUCCH at the next available uplink subframe or ignore the PUCCH (the behavior may be configured to the UE by higher layer signaling). If the gap occurs in special subframe which consists of downlink pilot time slot (DwPST), guard period (GP) and uplink pilot time slot (UpPTS), only UpPTS or DwPTS may be assumed as additional "gap" on top of gap period specified in special subframe depending on the case.

HARQ-ACK/NACK transmission may be transmitted separately for PCell and SCell respectively. Notably, uplink grant may be cross-carrier scheduled from SCell for PCell where downlink scheduling is self-scheduled. A UE may be configured to receive or decode uplink grant from SCell for PCell uplink transmission. Or, a UE may be configured to receive or decode uplink grant from both SCell and PCell for PCell uplink transmission and SCell uplink transmission.

Note that techniques proposed for FDD/TDD PCell/SCell carrier aggregation can be applicable to TDD/FDD PCell/SCell CA whenever applicable.

Similar to Option2a, frequency switching delay and propagation delay difference can be absorbed by adapting UL reception timing if possible.

FIG. 16 briefly illustrates uplink timing change by PCell to absorb the gap. In the example shown in FIG. 16, MeNB uplink timing is adjusted to absorb the gap. The option according to FIG. 16 can be called as option1a.

If the uplink timing of PCell cannot be adjusted, the special subframe (SUL where a few OFDM symbols would not be used for uplink transmissions and the rest OFDM symbols would be used for uplink transmissions) may be used between PCell/SCell uplink switch.

FIG. 17 briefly illustrates UL special subframe, which is described just before. The option according to FIG. 17 can be called as option1b.

The gap can be determined based on uplink timing advance configured or a higher layer signalling can be given.

Yet another option (this can be called as option1c) is to absorb the necessary gap at the guard period in TDD special subframe by configuring uplink timing advance or by configuring (e.g. shifting) the subframe boundary properly.

FIG. 18 briefly illustrates guard period utilization. By allowing UE to use timing advance (and thus tune the uplink reception timing at the small cell) which will be compensated by guard period defined in special subframe, the gap to switch frequency or absorb the propagation delay difference between PCell and SCell, can be handled.

For the option1c, from eNB perspective, the transmission/reception subframe configuration is shown in FIG. 19.

FIG. 19 briefly illustrates the case that uplink timing for TDD eNB and downlink timing for TDD eNB is adjusted to absorb the gap latency.

However, assuming special uplink subframe is not defined, the timing for option, then the timing of HARQ-ACK/NACK, PHICH, UL grant etc, can be defined newly. Different from the cases of tables 2 to 5, special subframes are not used for these cases because special subframe is assumed as not defined.

Table 6 shows new TDD UL/DL configuration under assumption that special subframe is not defined.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | U | X | D | D | D | U | X | D | D | D |
| 1_C | 5 ms | U | X | D | D | U | U | X | D | D | U |
| 2_C | 5 ms | U | X | D | U | U | U | X | D | U | U |
| 3_C | 10 ms | U | X | D | D | D | U | U | U | U | U |
| 4_C | 10 ms | U | X | D | D | U | U | U | U | U | U |
| 5_C | 10 ms | U | X | D | U | U | U | U | U | U | U |
| 6_C | 5 ms | U | X | D | D | D | U | X | D | D | U |

Table 7 shows HARQ-ACK/NACK timing corresponding to TDD UL/DL configuration of table 6.

TABLE 7

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | 8 | 7 | 6 | | | 8 | 7 | 6 |
| 1_C | 5 ms | | | 7 | 6 | | | | 7 | 6 | |
| 2_C | 5 ms | | | 7 | | | | | 7 | | |
| 3_C | 10 ms | | | 4 | 4 | 4 | | | | | |
| 4_C | 10 ms | | | 4 | 4 | | | | | | |
| 5_C | 10 ms | | | 4 | | | | | | | |
| 6_C | 5 ms | | | 7 | 6 | 5 | | | 8 | 7 | |

Here, HARQ-ACK/NACK signal is transmitted at (n+k)-th subframe when PDSCH is transmitted at n-th subframe (n, k are integer and n>0, k>0).

Table 8 shows an UL grant timing corresponding to TDD UL/DL configuration of table 6.

TABLE 8

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | | | 6 | | | | | 6 |
| 1_C | 5 ms | | | 7 | 7 | | | | 7 | 7 | |
| 2_C | 5 ms | | | 6, 7, 8 | | | | | 6, 7, 8 | | |
| 3_C | 10 ms | | | 4, 5 | | 6, 7 | | 8, 11 | | | |
| 4_C | 10 ms | | | 4, 5, 6 | | 6, 7, 11, 12 | | | | | |
| 5_C | 10 ms | | | 4, 5, 6, 7, 8, 11, 12, 13 | | | | | | | |
| 6_C | 5 ms | | | | | 6 | | 6 | | 7 | |

Here, PUSCH is transmitted at (n+k)-th subframe when UL grant is received at n-th subframe (n, k are integer and n>0, k>0).

Table 9 shows PHICH timing corresponding to the TDD UL/DL configuration of table 6.

TABLE 9

| Uplink-downlink configuration | Downlink-to-Uplink Switch-point periodicity | k | | | | | | | | | |
|---|---|---|---|---|---|---|---|---|---|---|---|
| | | 0 | 1 | 2 | 3 | 4 | 5 | 6 | 7 | 8 | 9 |
| 0_C | 5 ms | | | | | 4 | | | | | 4 |
| 1_C | 5 ms | | | 7 | 7 | | | | 7 | 7 | |
| 2_C | 5 ms | | | 7, 4, 8 | | | | | 7, 4, 8 | | |
| 3_C | 10 ms | | | 4, 5 | | 6, 7 | | 8, 9 | | | |
| 4_C | 10 ms | | | 9, 8, 7, 12 | | 4, 5, 6 | | | | | |
| 5_C | 10 ms | | | 12, 9, 8, 7, 6, 5, 4 | | | | | | | |
| 6_C | 5 ms | | | 7 | | 4 | | 4 | | | |

Here, PHICH is transmitted at n-th subframe when PHICH is transmitted (n−k)-th subframe (n, k are integer and n>0, k>0).

Option2—TDM between FDD DL (PCell) and TDD DL (SCell) with Dedicated Uplink to TDD UL (SCell)

Using this option2, once SCell (CA-ed SCell or U-Plane CC or dual connection) is configured to the UE, it may use its transmission capability to SCell uplink where all the uplink transmission to PCell and SCell will be delivered via SCell uplink (uplink signals/channels containing such as UCI, HARQ-ACK/NACK, PUSCH and PRACH).

In particular, when PCell eNB and SCell eNB are communicated via ideal backhaul (such as RRH used as SCell), transition to SCell uplink may be automatically enabled once SCell is activated. Automatic enabling may be applied to inter-site carrier aggregation. Or, with inter-site CA, uplink change may be occurred only based on explicit higher layer signaling.

When Option2 is used, the main benefit of option2 is to allow downlink data reception from both macro cell and small cell operating FDD and TDD (though not at the same time) by TDM.

To support this option2 and potentially option1, a couple of issues (1) to (8) related to downlink data and control channels shall be addressed.

(1) PHICH and UL Grant

ACK/NACK for uplink transmission (PHICH) will be transmitted separately for PCell and SCell respectively. For PCell PHICH and UL grant timing, a few mechanisms can be considered.

First, a UE may assume that a reference TDD DL/UL configuration is given where PHICH and UL grant timing is given by the reference configuration. In this case, PHICH timing could be "n+k+10+$l_{x2}$" when uplink transmission occurs at n-th subframe where k is according to the configured reference UL/DL TDD configuration or timing and $l_{x2}$ would be the backhaul latency in 10 msec between SCell eNB and PCell eNB (0 for less than 10 msec) as MATH 1.

$$l_{x2} = \lfloor backhauldelay/10 \rfloor * 10 \text{ msec} \quad <\text{MATH 1}>$$

If $l_{x2}$ is non-zero value, it would be informed to the UE so that the UE calculates the timing accurately. In this case, uplink grant timing would be n−k when uplink transmission at n-th subframe occurs. Alternatively, since PCell downlink shares the same subframe where uplink transmission at SCell occurs, simply PHICH and UL grant timing can be given as "10+$l_{x2}$" such that PHICH for uplink transmission at n-th subframe will be transmitted at (n+10)-th subframe and UL grant transmitted at n-th subframe will be performed at (n+10)-th subframe. In other words, uplink grant will be transmitted at (n−10)-th subframe if uplink transmission occurs in n-th subframe.

Another alternative approach is to disable UL grant transmitted from PCell such that PHICH and UL grant timing from PCell may not be necessary to be specified.

(2) HARQ-ACK/NACK

For ACK/NACK signal transmitted by UE for downlink data from PCell, if PCell can transmit only CSS (common search space) data using SI-RNTI, P-RNTI, RARNTI which does not require ACK/NACK, additional specification may not be necessary.

If PCell can transmit unicast data using user RNTI which requires ACK/NACK feedback, the timing of HARQ-ACK feedback may be configured similarly to PHICH where a reference configuration is given to the UE for HARQ-ACK transmission.

If this is used, since there is no TDD UL/DL configuration which can cover the PCell DL subframes, either a new HARQ timing is defined or a subframe offset may be additionally configured.

In this case, PHICH timing could be "n+k+10" when uplink transmission occurs at n-th subframe where k is according to the configured reference UL/DL TDD configuration or timing. Or, simply, downlink transmission at n-th subframe can be feedbacked at (n+10)-th UL subframe similar to PHICH.

In terms of HARQ-ACK/NACK transmission, same rule used for carrier aggregation for two TDD CCs can be used assuming a UE is configured with both PCell and SCell. Or alternatively, a UE may assume that PUCCH format 3 is used all the time such that all HARQ-ACK bits will be aggregated to PUCCH format 3 and transmitted assuming a UE is configured with only one CC.

(3) Maximum number of HARQ process number Basically, the main motivation of utilizing FDD capability to support "TDM-fashion" dual connectivity is not to increase UE complexity while supporting dual connectivity.

Thus, it would be desirable not to increase the maximum number of HARQ process and the requirement of soft buffer. Since, TDD may have larger maximum number of HARQ process to be supported, one way to determine the maximum number of HARQ process is to define as MATH 2.

$$\text{HARQ\_Num} = \max\{\text{supported maximum number of HARQ process at PCell, supported maximum number of HARQ process at SCell}\} \quad <\text{MATH 2}>$$

In this case, a few first or last HARQ processes would be reserved for PCell use (similar to SPS transmission). For example, HARQ process ID=0 and 1 may be reserved for PCell HARQ process where HARQ process ID=2 to HARQ_Num−1 would be used for SCell PDSCH transmissions.

(4) Soft Buffer Partitioning

In terms of computing soft buffer, MATH 3 is applicable.

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right) \quad <\text{MATH 3}>$$

To allow TDM-fashion dual connectivity, we can assume $N^{DL}_{cells}=1$ and $M_{DL\_HARQ}=\text{HARQ\_Num}$ defined in (3). If carrier aggregation approach is used, alternatively, it can be assumed that HARQ_num can be defined for each CC (PCell and SCell respectively) and $N^{DL}_{cells}=2$ and $M_{DL\_HARQ}$ can be assumed as the maximum number of HARQ process per CC (PCell and SCell respectively).

(5) Semi Persistent Scheduling (SPS)

SPS can be configured for PCell where SPS uplink transmission timing will follow PUSCH timing for UL grant (for activation message) and HARQ-ACK for SPS PDSCH and SPS release will follow HARQ-ACK timing.

(6) Handling Different Propagation Delay and Switching Delay

FIG. 20 briefly illustrates an example of gap to handle different propagation delay and frequency switching delay.

As shown in FIG. 20, switching of downlink from f1 (PCell DL) to f3 (SCell DL) or vice versa may require some gap to handle different propagation delay if macro cell and small cell have different propagation delay. To avoid potential propagation delay differences, SCell or PCell may adapt its transmission timing so that downlink subframe boundary of PCell and SCell at the UE are aligned.

And thus, even with DL switch from PCell to SCell (or vice versa), it does not require any gap to compensate the difference.

FIG. 21 briefly illustrates this alternative example frequency switching. The case of FIG. 21 can be called as option2a.

The transmission timing adjustment from SCell may include both difference of propagation delay and frequency switching delay so that frequency delay can be absorbed by special subframe UpPTS and/or GW. In this case, from a UE perspective, the assigned downlink subframes for PCell and SCell DL subframes (including DwPTS) may be utilized 100% without any gap. The following is described assuming the compensation by SCell (or PCell) is not considered.

As shown in FIG. 20, assuming macro cell has larger propagation delay, to switch to SCell with shorter propagation delay, the gap would be required where the gap can be determined based on timing advance values of two cells.

The gap can be absorbed by PCell downlink or SCell downlink (the example shows the case where PCell takes the gap). The gap also includes the necessary frequency switching delay. Whenever necessary, the gap can be assumed.

When special subframe is used before switching, UpPTS may be used for the gap so that additional gap may not be necessary. Note that, the gap illustrated in FIG. 20 is an example. The gap can be configured (by higher layer) or pre-determined to occur either in SCell or both PCell and SCell (divided between two e.g., propagation delay is absorbed by PCell and switching delay is handled by SCell).

(7) PRACH Transmission for PCell

When uplink synchronization is needed by PCell, PRACH transmission via PCell uplink frequency may be needed. In this case, SCell may trigger PDCCH order via SCell DL with uplink CC CIF to PCell such that a UE can transmit PRACH via PCell UL frequency or PCell may trigger PDCCH order where PRACH will be transmitted at the first available uplink subframe after 10 subframes.

The same protocol may be applied to aperiodic sounding reference signal (SRS) transmission as well. For periodic SRS transmission, a UE may assume that SRS configuration for SCell is valid whereas SRS configuration for PCell is assumed to be invalid for periodic SRS transmission.

(8) CSI Feedback

A couple of mechanisms are feasible to handle channel state information (CSI) feedback for PCell and SCell. One approach is to have more than one CSI processes allocated for UE to support CSI feedback for PCell and SCell separately. Using this approach, PCell and SCell may configure different CSI-RS configurations.

Another approach is to use "restricted measurement" $CSI_0$ and $CSI_1$ configured for PCell downlink and SCell downlink respectively (or vice versa) where only one CSI-RS configuration is given to the UE.

Either first or the second approach, UE shall assume a subframe where downlink for PCell is not available or downlink for SCell is not available as uplink subframe so that it does not expect to receive configured CSI-RS in that subframe. For example, in a figure of FIGS. 9 to 13, etc., UE shall assume that CSI-RS will not be present in the subframes other than subframe 2, 3 and 7, 8.

Another option is to disable periodic CSI feedback for PCell. It may configure additional CSI-RS resource for PCell which will be used only for aperiodic CSI feedback upon triggering.

Option 3—TDM Between FDD DL (PCell) and TDD DL (SCell) and TDM Between FDD UL (PCell) and TDD UL (SCell)

This option is to further allow uplink transmission of PCell on top of option2. Similar to option2, downlink between PCell and SCell would be time-shared. For uplink, it can be time-shared among available uplink subframes of SCell UL/DL configurations. For the uplink time-share between PCell and SCell, techniques proposed for option1 can be applicable here as well.

Option4—Semi-Static TDM Between FDD (PCell) and TDD (SCell)

This option is to allow a UE to switch FDD and TDD semi-statically to support both PCell and SCell. Assuming PCell may not transmit downlink data or schedule uplink transmissions frequently, transition to PCell may be limited only to the essential functionalities such as SIB update and measurement. Since SIB update is indicated by paging, UE shall switch to FDD according to paging cycle configured to itself.

Besides, a UE should be configured with "PCell measurement period and duration" where a UE shall perform RRM on FDD PCell. When SIB is updated, UE shall read SIB from PCell by staying at PCell for "T" duration where "T" would be the time to read the updated SIB (T is determined based on the target SIBs updated, e.g., SIB1 update may require reading SIB1 within 40 msec, thus T would be 40 msec).

A UE shall assume that any downlink or uplink scheduling to/from SCell would not be occurred when a UE switches to PCell duplex mode. The gap to switch between PCell and SCell, one or a few subframe(s) may be assumed before and after (in other words, every switch, two subframes would not be used for neither downlink or uplink scheduling/transmission).

If PCell and SCell are inter-site carrier aggregated to the UE, the backhaul delay between PCell and SCell may be considered before a UE switches between FDD and TDD. For example, if PCell SIB is updated and thus a UE shall switch to PCell for reading SIB, either PCell eNB informs the SCell eNB for appropriate configuration or the UE shall indicate the SCell eNB for the change before making its change. Thus, the delay of switching may be longer to account for the delay to communicate either between PCell and SCell or between UE and SCell.

All these options, if uplink PUSCH/PUCCH (new or modified PUSCH or PUCCH) can be transmitted in special uplink (shortened uplink subframe) subframe, special uplink subframe can be used for uplink transmission for the dual-mode UE. Otherwise, special uplink subframe (SUL) may not be used for any uplink transmission.

If configured properly, SRS may be allowed to be transmitted in SUL (in a first one or two OFDM symbols).

If special uplink subframe is not used, and the gap is handled by guard period of TDD special subframes, eNB handles "TDM-fashion" transmission/reception by scheduling.

Yet, UE should be aware of the TDM pattern so that it can change the frequency accordingly. The chosen downlink and uplink subframes of PCell and/or SCell should be configured to the UE. If there is no configuration given, UE shall assume a default pattern (for example, if TDD UL/DL configuration is DSUUDDSUUD for 10 subframes (here, D is a downlink subframe, U is a uplink subframe and S is a special subframe), then FDD subframe will be used as UXDDUUXDDU where X is a subframe not used for any PCell TX/RX) according to the configured SCell pattern is used.

Next scenario is to look at TDD PCell and FDD SCell where TDD PCell may utilize the resource where FDD SCell is configured as "ABS" subframes as shown in FIG. 22 and FIG. 23.

FIG. 22 briefly illustrates an example of dual connectivity between TDD macro cell (f1) and FDD small cell (f2/f3).

FIG. 23 briefly describes TDD and FDD configuration corresponding to the case of FIG. 22. Here, in UE perspective, the UE may be regard as configured for TDM between TDD and FDD such as coption2.

The available UL and/or DL subframes can be union of ABS subframes configured for SCell and TDD UL/DL configuration configured for PCell as shown in the example of FIG. 23.

For HARQ-ACK timing assuming HARQ-ACK is transmitted separately for PCell and SCell, if uplink subframe is not available following TDD UL/DL configuration, it shall take the next available uplink subframe. for example, downlink transmitted at 1st subframe does not have available uplink (7th uplink subframe). Thus, HARQ-ACK may be transmitted 8th uplink subframe instead.

The similar thing can be applicable to PHICH and UL grant where the next available downlink will carry PHICH and/or UL grant for the uplink transmission. If HARQ-ACK and/or PHICH are transmitted by SCell in an aggregated fashion, it may follow FDD timing where uplink subframe for SCell may be configured as ABS subframe (where UE may transmit uplink regardless).

In terms of soft buffer processing, similar options presented for FDD/TDD CA options in above can be applied.

Another option to consider is allow continuous downlink or uplink in SCell FDD and uplink or downlink capability may be changed between TDD and FDD as shown FIG. 24.

FIG. 24 briefly illustrates an example of continuous DL (upper) and UL (below) FDD operation. Referring to FIG. 24, for option A, FDD DL of SCell is continuous. In addition, for option B, FDD UL of SCell is continuous.

For the all options listed in this application, in may be considered that a few message exchanges among PCell and SCell eNBs.

First, a subset of DL subframes and/or a subset of UL subframes that PCell (or SCell) like to utilize can be exchanged for the subframe partitioning coordination. The subset can be divided within a radio frame or within ABS configuration duration (e.g., 40 msec for FDD) or a predetermined period (e.g., 100 msec).

Second, the timing advance value that each cell configures to the UE can be exchanged so that timing adjustment (e.g., TA for SCell or PCell, downlink subframe boundary adjustment, etc) can be performed to absorb the propagation delay difference and frequency switching delay.

Third, RRM measurement on the SCell (or PCell) and RLM measurement on the SCell (or PCell) can be exchanged so that PCell determines when to deactivate the SCell.

FIG. 25 is a flow chart briefly describing an operation of UE based on described as before.

Referring to FIG. 25, the UE receives downlink signal at step of S2510. The UE may receive signal from the eNB which is PCell or SCell, or are PCell and SCell.

The UE transmits uplink signal at step of S2520. The UE may transmit signal to the eNB which is PCell or SCell, or are PCell and SCell.

Here, the UE may operate under dual connectivity circumstances with dual mode. Specifically, the UE may be configured for TDM between TDD and FDD. In addition the UE may performs single transmission of signal on uplink and single reception of signal on downlink at one subframe.

The specific TDM configurations are same as closely described above.

FIG. 26 is a block diagram which briefly describes a wireless communication system including an UE 2600 and a BS 2640. The UE 2600 and the BS 2640 may operate based on the description as explained above.

In view of downlink, a transmitter may be a part of the BS 2640 and a receiver may be a part of the UE 2600. In view of uplink, a transmitter may be a part of the UE 2600 and a receiver may be a part of the BS 2640.

Referring to FIG. 26, the UE 2600 may include a processor 2610, a memory 2620 and a radio frequency (RF) unit 2630. The UE 2600 may operate under dual connectivity circumstances with dual mode, i.e. the UE may configured for TDM between FDD and TDD.

The processor 2610 may be configured to implement proposed procedures and/or methods described in this application. For example, the processor 2610 may operatively coupled to the RF unit 2630, wherein the processor 2610 is configured for transmitting signals via the RF unit 2620 based on a scheduling for UL and/or DL. The processor 2610 may perform single transmission of signal on uplink and single reception of signal on downlink at one subframe via the RF unit 2630.

The memory 2620 is coupled with the processor 2610 and stores a variety of information to operate the processor 2610, which includes data information and/or control information.

The RF unit 2630 is also coupled with the processor 2610. The RF unit 2630 may receive signal from at least one cell and transmits signal to at least one cell with carrier aggregation.

The detailed operations of the UE 2600 are same as described above.

The BS 2640 may include a processor 2650, a memory 2660 and a RF unit 2670. Here, the BS may be PCell or SCell and the BS may be a macro cell or small cell.

The processor 2650 may be configured to implement proposed procedures and/or methods described in this application. For example, the processor 950 may schedule UL and/or DL. Specifically, the processor 950 may schedule UL/DL transmission with TDM between TDD and FDD. Here, FDD may be configured for macro cell and TDD may be configured for small cell. Alternatively, FDD may be configured for small cell and TDD may be configured for macro cell.

In addition, the processor may schedule UL/DL for a UE which can only perform single transmission of signal on uplink and single reception of signal on downlink at one subframe.

The memory 2660 is coupled with the processor 2650 and stores a variety of information to operate the processor 2650, which includes data information and/or control information. The RF unit 2670 is also coupled with the processor 2650. The RF unit 2670 may transmit and/or receive a radio signal.

The detailed operations of the BS 2640 are same as described above.

The UE 2600 and/or the BS 2640 may have single antenna or multiple antennas. The wireless communication system may be called as multiple input/multiple output (MIMO) system when at least one of the UE 2600 and the BS 2640 has multiple antennas.

It should be noted that the methods in this application can be applied under dual connectivity circumstance as well as applied with carrier aggregation as described above.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A user equipment (UE) configured for a time division multiplex (TDM) between a time division duplex (TDD) and a frequency division duplex (FDD), the UE comprising:
a radio frequency (RF) unit; and
a processor operatively coupled to the RF unit,
wherein the processor is configured to transmit a signal via the RF unit based on a scheduling for an uplink (UL) and/or a downlink (DL),
wherein the RF unit receives the signal from at least one cell and transmits the signal to at least one cell using a carrier aggregation scheme,
wherein the processor performs a single transmission of the signal on the UL and a single reception of the signal on the DL at one subframe via the RF unit,
wherein, when a transition from a TDD to an FDD has occurred, a TDD downlink transmission is scheduled based on a first delay caused by a propagation and a second delay caused by a frequency switching,
wherein a primary cell (PCell) is scheduled based on the first delay caused by the propagation and a secondary cell (SCell) is scheduled based on the second delay caused by the frequency switching,
wherein, when the PCell is unavailable for adjusting the delay, the transition from the TDD to the FDD has occurred at a special subframe, and
wherein the special subframe contains one or more orthogonal frequency division multiplexing (OFDM) symbols that are not used for a UL transmission.

2. The UE of claim 1, wherein the processor performs the single transmission of the signal on the UL and the single reception of the signal on the DL at one subframe for a single component carrier via the RF unit.

3. The UE of claim 1, wherein the Pcell is configured with the FDD when the UE has a half-duplex FDD capability and the Scell is configured with the TDD.

4. The UE of claim 1, wherein be downlink is shared between FDD downlink subframes and TDD downlink subframes for the UE, and the UL is shared between an FDD uplink subframe and TDD uplink subframes for the UE in a TDM manner.

5. The UE of claim 4, wherein the uplink/downlink is re-configured for the PCell after the uplink/downlink is configured for the SCell or the SCell is configured.

6. The UE of claim 1, wherein an FDD downlink and an FDD uplink are configured for the PCell and an TDD uplink and an FDD downlink are configured for the SCell.

7. The UE of claim 1, wherein the TDD is configured for the PCell and the FDD is configured for the SCell.

8. The UE of claim 7, wherein the processor adjusts a timing of ACK/NACK signal for an uplink transmission by a backhaul latency between the PCell and the SCell.

9. A method of a time division multiplex (TDM) between a time division duplex (TDD) and a frequency division duplex (FDD) by a user equipment (UE), the method comprising:
    receiving a signal from at least one cell according to a downlink (DL) scheduling; and
    transmitting the signal to at least one cell according to an uplink (UL) scheduling,
    wherein a single transmission of the signal is performed on the UL and a single reception of the signal is performed on the DL at one subframe,
    wherein, when a transition from a TDD to an FDD is occurred, a TDD downlink transmission is scheduled based on a first delay caused by a propagation and a second delay caused by a frequency switching,
    wherein a primary cell (PCell) is scheduled based on the first delay caused by the propagation and a secondary cell (SCell) is scheduled based on the second delay caused by the frequency switching,
    wherein, when the PCell is unavailable for adjusting the delay, the transition from the TDD to the FDD has occurred at a special subframe, and
    wherein the special subframe contains one or more orthogonal frequency division multiplexing (OFDM) symbols that are not used for a UL transmission.

10. The method of claim 9, wherein the processor performs the single transmission oft signal on the UL and the single reception of the signal on the DL at one subframe for a single component carrier.

11. The method of claim 9, wherein the DL is shared between FDD downlink subframes and TDD downlink subframes for the UE, and the UL is shared between an FDD uplink subframe and TDD uplink subframes for the UE.

* * * * *